(12) United States Patent
Koganei et al.

(10) Patent No.: US 11,647,744 B2
(45) Date of Patent: May 16, 2023

(54) DISPERSION SOLUTION HAVING ANTIVIRAL PROPERTY

(71) Applicant: TOYO SEIKAN GROUP HOLDINGS, LTD., Tokyo (JP)

(72) Inventors: Akiko Koganei, Yokohama (JP); Kazuaki Ohashi, Yokohama (JP); Yasuhiro Kosaka, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 16/469,241

(22) PCT Filed: Dec. 4, 2017

(86) PCT No.: PCT/JP2017/043391
§ 371 (c)(1),
(2) Date: Jun. 13, 2019

(87) PCT Pub. No.: WO2018/110332
PCT Pub. Date: Jun. 21, 2018

(65) Prior Publication Data
US 2019/0350195 A1    Nov. 21, 2019

(30) Foreign Application Priority Data

Dec. 15, 2016   (JP) .............................. JP2016-243148

(51) Int. Cl.
| | |
|---|---|
| *H01B 1/22* | (2006.01) |
| *H01L 23/00* | (2006.01) |
| *A01N 25/04* | (2006.01) |
| *A01N 25/30* | (2006.01) |
| *A01N 37/02* | (2006.01) |
| *A01N 59/20* | (2006.01) |
| *D06M 11/42* | (2006.01) |

(52) U.S. Cl.
CPC .............. *A01N 25/04* (2013.01); *A01N 25/30* (2013.01); *A01N 37/02* (2013.01); *A01N 59/20* (2013.01); *D06M 11/42* (2013.01)

(58) Field of Classification Search
CPC ........ A01N 25/04; A01N 59/20; D06M 11/42
See application file for complete search history.

(56) References Cited

U.S. PATENT DOCUMENTS

| | | | |
|---|---|---|---|
| 6,294,186 B1 | 9/2001 | Beerse et al. | |
| 6,471,976 B1 * | 10/2002 | Taylor .................... | A01N 59/20 424/463 |
| 8,784,702 B2 | 7/2014 | Nakamoto et al. | |
| 2005/0065232 A1 | 3/2005 | Okimoto et al. | |
| 2006/0068024 A1 | 3/2006 | Schroeder et al. | |
| 2007/0207335 A1 | 9/2007 | Karandikar et al. | |
| 2008/0102122 A1 | 5/2008 | Mahadevan et al. | |
| 2009/0104281 A1 | 4/2009 | Taylor et al. | |
| 2009/0143478 A1 | 6/2009 | Richardson et al. | |
| 2009/0163606 A1 * | 6/2009 | Kirby .................. | B01F 17/0007 516/56 |
| 2010/0108366 A1 | 5/2010 | Kim et al. | |
| 2012/0301528 A1 | 11/2012 | Uhlmann et al. | |
| 2013/0224309 A1 | 8/2013 | Qiu et al. | |
| 2013/0281283 A1 | 10/2013 | Hashimoto et al. | |
| 2014/0199357 A1 * | 7/2014 | Hashimoto ............ | A01N 59/20 424/405 |
| 2014/0286883 A1 * | 9/2014 | Zecchino ............. | A61K 31/222 424/59 |
| 2016/0167130 A1 * | 6/2016 | Ida ....................... | C09D 11/037 424/418 |
| 2016/0255841 A1 | 9/2016 | Ohashi et al. | |
| 2016/0289459 A1 | 10/2016 | Ohashi et al. | |
| 2017/0086463 A1 | 3/2017 | Fujimori et al. | |
| 2019/0098902 A1 | 4/2019 | Ogata et al. | |

FOREIGN PATENT DOCUMENTS

| | | |
|---|---|---|
| CN | 102511503 A | 6/2012 |
| CN | 105123753 A | 12/2015 |
| JP | 05-2318 B2 | 6/1930 |
| JP | 6-158042 A | 6/1994 |
| JP | 8-12513 A | 1/1996 |
| JP | 11-323207 A | 11/1999 |
| JP | 2003-511474 A | 3/2003 |
| JP | 2005-53793 A | 3/2005 |
| JP | 2005-53794 A | 3/2005 |
| JP | 2006-70104 A | 3/2006 |
| JP | 2007-526139 A | 9/2007 |
| JP | 2008-508321 A | 3/2008 |
| JP | 2008-514630 A | 5/2008 |
| JP | 2008-523064 A | 7/2008 |
| JP | 2009-500645 A | 1/2009 |
| JP | 2009-41029 A | 2/2009 |

(Continued)

OTHER PUBLICATIONS

Translation of Japanese Publication 05-2318 published Jun. 11, 1930.
Wang et al. "A novel wet-chemical method of preparing highly monodispersed $Cu_2O$ nanoparticles", Colloids and Surfaces A: Physicochemical and Engineering Aspects, vol. 388, 2011, pp. 38-40.
Communication dated Apr. 28, 2020 by the European Patent Office in application No. 17880621.2.
Office Action dated Aug. 25, 2020 in Japanese Application No. 2016-243148.
McMurry et al., McMurry Organic Chemistry (the third volume), Tokyo Kagaku Dojori, Dec. 24, 2013, eighth edition, p. 1046 (4 pages total).

(Continued)

*Primary Examiner* — Kyle A Purdy
(74) *Attorney, Agent, or Firm* — Sughrue Mion, PLLC

(57) ABSTRACT

A dispersion solution including a solvent which contains fine particles of a copper compound, a stabilizer, a fatty acid, a fatty acid ester of the fatty acid, and a polycarboxylic acid. The fine particles of the copper compound having antiviral property are homogeneously dispersed in the dispersion medium maintaining stability over extended periods of time.

7 Claims, 1 Drawing Sheet

(56) References Cited

FOREIGN PATENT DOCUMENTS

| | | | |
|---|---|---|---|
| JP | 2009-526132 | A | 7/2009 |
| JP | 2010-514463 | A | 5/2010 |
| JP | 2011-26357 | A | 2/2011 |
| JP | 5194185 | B1 | 5/2013 |
| JP | 2013-166705 | A | 8/2013 |
| JP | 5318272 | B1 | 10/2013 |
| JP | 2013-241512 | A | 12/2013 |
| JP | 2014-1190 | A | 1/2014 |
| JP | 5452966 | B2 | 3/2014 |
| JP | 2014-519504 | A | 8/2014 |
| JP | 2015-78243 | A | 4/2015 |
| JP | 5707134 | B2 | 4/2015 |
| JP | 2015-86435 | A | 5/2015 |
| JP | 2015-120896 | A | 7/2015 |
| WO | 2004/037932 | A1 | 5/2004 |
| WO | 2010/026730 | A1 | 3/2010 |
| WO | 2013/002151 | A1 | 1/2013 |
| WO | 2017/170593 | A1 | 10/2017 |

OTHER PUBLICATIONS

International Search Report for PCT/JP2017/043391 dated Mar. 6, 2018 (PCT/ISA/210).
Communication dated Mar. 3, 2021, issued by the Japanese Patent Office in application No. 2016-243148.
"Encyclopedia of Chemical Encyclopedia, vol. 4, Luminescent Material—Fluorofa-fu", Encyclopedia of Chemical Engineering, Editorial Board, p. 494, Chemical Industry Press, Sep. 1993 (3 pages total).
Li Guangyu et al., "Adhesive Raw Materials Handbook", p. 652, National Defense Industry Press, Aug. 2004 (3 pages total).
Zhang Zhiqiang, et al., "Chemical Building Materials", p. 75, Chongqing University Press, 2000 (3 pages total).
Communication dated Jul. 29, 2021 from the China National Intellectual Property Administration in corresponding CN application No. 201780084421.9.
McMurry et al., McMurry Organic Chemistry (the third volume), Tokyo Kagaku Dojin, Dec. 24, 2013, eighth edition, p. 1046 (5 pages total).

* cited by examiner

DISPERSION SOLUTION HAVING ANTIVIRAL PROPERTY

This application is a National Stage of International Application No. PCT/JP2017/043391 filed Dec. 4, 2017, claiming priority based on Japanese Patent Application No. 2016-243148 filed Dec. 15, 2016.

TECHNICAL FIELD

This invention relates to a dispersion solution having antiviral property. More specifically, the invention relates to a dispersion solution in which particles of a copper compound having antiviral property are homogeneously dispersed in a dispersion medium maintaining stability over extended periods of time.

BACKGROUND ART

Silver ions and copper (II) ions have heretofore been used as effective components for the materials that exhibit antibacterial and antiviral properties. There have also been proposed various antiviral materials obtained by carrying these metal ions on a material such as zeolite or silica gel or by dispersing these metal ions in a solvent.

The above metal ions are capable of expressing antiviral property against the viruses having an envelope structure, such as influenza viruses but are not capable of expressing antiviral property against the viruses having no envelope structure, such as noroviruses.

There have also been known monovalent copper compounds as metal compounds capable of expressing antiviral property regardless of the presence of the envelope structure. For instance, a patent document 1 described below is disclosing an antiviral composition containing fine particles of a monovalent copper compound, a reducing agent and a dispersion medium, and having a pH of not more than 6.

Moreover, a patent document 2 described below is disclosing a virus inactivating agent containing fine particles of a monovalent copper compound and a dispersion medium, the fine particles of the monovalent copper compound being those of chloride, acetate, sulfide, iodide, bromide, peroxide, oxide, hydroxide, cyanate, thiocyanate, or a mixed compound thereof.

Further, a patent document 3 below is describing copper-type nanoparticles containing organic components, cuprous oxide and cupper, prepared by heat-treating, in a non-oxidizing atmosphere, an organic copper compound at a temperature higher than a decomposition start temperature thereof but lower than a completely decomposing temperature thereof in the presence of an organic matter that contains a 1,2-alkanediol having 8 to 30 carbon atoms and/or a derivative thereof and a tertiary amine compound.

PRIOR ART DOCUMENTS

Patent Documents

Patent document 1: Japanese Patent No. 5194185
Patent document 2: Japanese Patent No. 5452966
Patent document 3: Japanese Patent No. 5707134

OUTLINE OF THE INVENTION

Problems That the Invention is to Solve

As described above, the fine particles of the monovalent copper compound described in the above patent document have excellent antiviral property. However, the fine particles of the monovalent copper compound having antiviral property tend to be easily aggregated in a non-aqueous solvent, and cannot be homogeneously dispersed therein. Therefore, antiviral property possessed by the fine particles of the monovalent cupper compound could not be efficiently expressed when the dispersion solution was used in the form of an antiviral composition or when the dispersion solution was mixed with a coating material so as to be used in the form of an antiviral formed article by being coated with a mixture thereof.

In the case of the antiviral inactivating agent described in the above patent document 2, fine particles of the monovalent cupper compound obtained by pulverizing the monovalent copper compound are added to water or a lower alcohol to prepare a dispersion solution in which the fine particles are dispersed and pulverized. Therefore, the fine particles are subject to be aggregated and, besides, it happens that the cuprous oxide is easily oxidized into a copper oxide (II).

Further, according to the above patent document 3, the copper-type nanoparticles are intended to be used in the form of a paste for forming wirings. If used in the form of a dispersion solution by using a non-aqueous solvent, therefore, there arises a problem in that the copper-type nanoparticles cannot be dispersed maintaining stability over time.

It is, therefore, an object of the present invention to provide a dispersion solution having antiviral property, in which particles of a copper compound and, specifically, particles of a monovalent copper compound are homogeneously dispersed maintaining stability over extended periods of time, the dispersion solution being capable of efficiently expressing antiviral property possessed by the fine particles of the copper compound over extended periods of time.

Means for Solving the Problems

According to the present invention, there is provided a dispersion solution comprising a solvent which contains fine particles of a copper compound, a stabilizer, a fatty acid, a fatty acid ester of the fatty acid, and a polycarboxylic acid.

In the dispersion solution of the invention, it is desired that:
1. The polycarboxylic acid has a number average molecular weight of 2,000 to 10,000;
2. The particles of the copper compound are the particles of a monovalent copper compound;
3. The monovalent copper compound is a cuprous oxide;
4. The solvent is a non-aqueous solvent;
5. The non-aqueous solvent is an ester-type solvent;
6. The stabilizer is at least the one selected from a saccharin, a salicylic acid, an aspartic acid and a citric acid;
7. A dispersing agent is, further, contained; and
8. The copper compound has antiviral property.

Effects of the Invention

The dispersion solution of the present invention contains a stabilizer, a fatty acid, a fatty acid ester of the fatty acid and a polycarboxylic acid in addition to the fine particles of the copper compound. Even when contained at high concentrations in a solvent, therefore, the particles of the copper compound do not aggregate but remain dispersed homogeneously for extended periods of time. Therefore, excellent properties possessed by the particles of the copper compound can be efficiently expressed for extended periods of time. Specifically, since the copper compound is a monovalent copper compound, the antiviral property can be efficiently expressed even against the viruses having no envelope structure as described above.

That is, in the dispersion solution of the present invention, it is considered that the fatty acid, the ester compound of the fatty acid and the polycarboxylic acid contained in the dispersion solution are coordinated in the form of protection layers on the fine particles of the copper compound. Therefore, even the monovalent copper compound having poor stability is allowed to stably maintain its monovalent state. Besides, the fine particles of the copper compound are allowed to remain homogeneously dispersed in the non-aqueous solvent without precipitating. Therefore, the dispersion solution can be favorably used as a solvent for diluting the coating compositions and the resin compositions to impart various properties to the films and the formed resin articles.

In the present invention, specifically, the surfaces of the particles of the copper compound are coated with the polycarboxylic acid. Namely, increased repulsive forces are imparted to the particles of the copper compound. Accordingly, the particles of the copper compound exhibit improved dispersion stability over extended periods of time without undergoing aggregation or precipitation.

In the specification, the words antiviral property stand for inactivating the viruses.

MODES FOR CARRYING OUT THE INVENTION

Figure 1:
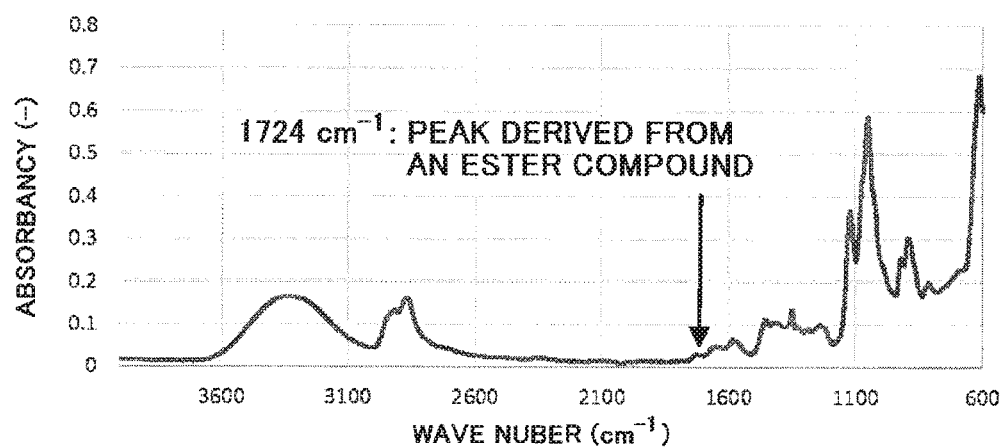
FIG. 1 It is an IR chart of the particles in Example 1.
Figure 2:
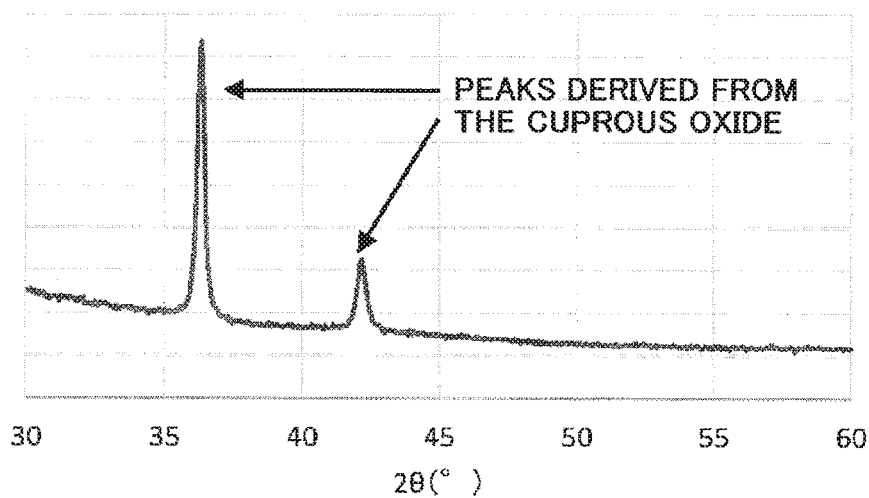
FIG. 2 It shows a profile of an X-ray diffraction of the particles in Example 1.

As described above, it is an important feature of the present invention that the dispersion solution of the present invention comprises a solvent which contains fine particles of a copper compound, a stabilizer, a fatty acid, a fatty acid ester of the fatty acid, and a polycarboxylic acid.

[Fine Particles of the Copper Compound]

In the dispersion solution of the present invention, the copper compound which is a component that effectively exhibits the antiviral property is a monovalent copper compound or a divalent copper compound. Both of these compounds are capable of inactivating the viruses by adsorbing the viruses. Here, the divalent copper compound exhibits the antiviral property against the viruses that have an envelope structure while the monovalent copper compound is capable of expressing the antiviral property irrespective of if the viruses have the envelope or not.

As the copper compound, there can be exemplified oxide, acetic acid compound, chloride, bromide, hydroxide and cyanide. Among them, the cuprous oxide is specifically preferred.

In the present invention, the fine particles of the copper compound are coated on their surfaces with the fatty acid, the polycarboxylic acid and the ester compound of the fatty acid. This prevents the oxidation on the surfaces of the fine particles of the copper compound that is caused by an increase in the surface activity of the fine particles and, further, suppresses the aggregation of the fine particles. Specifically, the particles of the monovalent copper compound have a high surface activity and tend to be oxidized and aggregated. Upon being coated with the fatty acid, the ester compound of the fatty acid and the polycarboxylic acid, however, the fine particles of the monovalent copper compound can be homogeneously dispersed in the dispersion solution to exhibit excellent antiviral property.

The fine particles of the copper compound, further, exhibit antibacterial property, electrically conducting property, ultraviolet ray-shielding property and anti-fouling property in addition to exhibiting antiviral property.

As the fatty acid for covering the surfaces of the fine particles of the copper compound, there can be exemplified myristic acid, stearic acid, oleic acid, palmitic acid, n-decanoic acid, paratoluic acid, succinic acid, malonic acid, tartaric acid, malic acid, glutaric acid, adipic acid and acetic acid, which may be used in a plurality of kinds in combination. Specifically, however, the stearic acid is preferred.

As the ester compound of the fatty acid, further, there can be exemplified an ester compound with a high-boiling solvent that will be described later. When, for example, the fatty acid is a stearic acid and the high-boiling solvent is a diethylene glycol, it is a diethylene glycol distearate. As described above, upon being coated with the fatty acid and, further, with the ester compound of the fatty acid, the above-mentioned actions and effects can be exhibited more conspicuously than when coated with the fatty acid only.

In the invention, the fine particles of the copper compound have a mean particle size in a range of, preferably, 1 to 200 nm. In the dispersion solution of the invention, the fine particles of the copper compound are homogeneously dispersed without being aggregated even when the concentration thereof is high. Therefore, upon being compounded by the fact that the copper particle sizes are within the above-mentioned range, the fine particles of the copper compound are allowed to efficiently express their excellent antiviral property.

In the dispersion solution of the invention, it is desired that the fine particles of the copper compound coated on their surfaces thereof with the fatty acid, ester compound of the fatty acid and polycarboxylic acid described later, are contained in an amount of 0.01 to 2 wt % and, specifically, 0.05 to 1 wt % in the dispersion solution. When the amount of the fine particles of the copper compound is smaller than the above range, the antiviral property cannot be expressed as sufficiently as when the amount thereof is in the above range. When the amount of the fine particles of the copper compound is larger than the above range, on the other hand, it becomes disadvantageous in economy and, besides, the applicability and formability might be impaired when the dispersion solution is used for the coating compositions and the resin compositions as compared to when the amount of the fine particles of the copper compound is in the above-mentioned range.

In the specification, the single particle is a particle that has no gap between a fine particle of the copper compound and a fine particle of the copper compound, and the mean particle size is a mean size of such single particles.

[Stabilizer]

The dispersion solution of the present invention contains a stabilizer enabling the fine particles of the copper compound to be stably maintained in either a monovalent state or a divalent state. The dispersion solution contains the stabilizer and, besides, the fine particles of the copper compound are coated on their surfaces with the fatty acid, ester compound of the fatty acid and polycarboxylic acid. Therefore, the fine particles of the copper compound are little likely to be oxidized and can be made present in the dispersion solution maintaining stability over extended periods of time. The stabilizer may often be dissolved depending upon the solvent that is used. It is, however, considered that the stabilizer is coordinated on the fine particles of the copper compound together with the fatty acid, ester compound of the fatty acid and polycarboxylic acid.

As the stabilizer, there can be exemplified saccharin, salicylic acid, aspartic acid and citric acid. The saccharin, however, can be favorably used.

The stabilizer is contained in the dispersion solution in an amount of, desirably, 0.01 to 0.1 wt % and, specifically, 0.02 to 0.05 wt %. When the amount of the stabilizer is smaller than the above range, the stability of the fine particles of the copper compound cannot be improved as much as when the amount thereof is within the above range. Even when the amount of the stabilizer is larger than the above range, on the other hand, no further improved effect can be expected but bringing about only disadvantage in economy.

[Polycarboxylic Acid]

The dispersion solution of the present invention contains the polycarboxylic acid enabling, as described above, the particles of the copper compound to be dispersed therein maintaining stability over extended periods of time.

As the polycarboxylic acid, there can be exemplified homopolymers or copolymers of monomers having a carboxyl group, such as polyacrylic acid, polymethacrylic acid, polymaleic acid, polyitaconic acid and acrylic acid-methacrylic acid copolymer.

Specifically, from the standpoint of being coordinated on the surfaces of the particles of the copper compound and preventing the aggregation of the particles of the copper compound by utilizing the repulsion due to the steric hindrance of the molecular chains according to the present invention, it is desired to use the polycarboxylic acid of a high molecular weight having a number average molecular weight in a range of 2,000 to 10,000.

It is desired that the polycarboxylic acid is contained in the dispersion solution in an amount of 0.01 to 5 wt % and, specifically, 0.5 to 2 wt %. When the amount of the polycarboxylic acid is smaller than the above range, the dispersion stability over time of the fine particles of the copper compound cannot be improved as much as when the amount thereof is within the above range. Even when the amount of the polycarboxylic acid is larger than the above range, on the other hand, no further improved effect can be expected but bringing about only disadvantage in economy.

[Others]

The dispersion solution of the present invention, preferably, contains a dispersing agent in addition to the above-mentioned fine particles of the copper compound, stabilizer, fatty acid, ester compound of the fatty acid and polycarboxylic acid. It is, therefore, allowed to obtain the dispersion solution in which the fine particles of the copper compound are homogeneously dispersed even at high concentrations. That is, adsorption groups of the dispersing agent are adsorbed by the surfaces of the particles of the copper compound, and compatibility with the non-aqueous solvent is improved by the main chains or the side chains of the dispersing agent. Here, repulsion is produced by the steric hindrance of the high-molecular chains enabling, therefore, the fine particles of the copper compound to be homogeneously dispersed in the solvent while suppressing the aggregation and, further, eliminating the aggregation over time being aided by the presence of the polycarboxylic acid.

As the dispersing agent, there can be exemplified a high-molecular dispersing agent having, as the adsorption group, one or more kinds of primary, secondary or tertiary amine, amine salt thereof with its counter ion neutralized, carboxylic acid or carboxylate, or hydroxyl group and, further, having, on the main chains and side chains thereof, fatty acid, polyether, polyester, polyurethane or polyarylate. The dispersion solution of the present invention contains the polycarboxylic acid as an essential component. Therefore, there can be used a dispersing agent having acidic adsorption groups and, specifically, a dispersing agent having a pH of 4 to 6, which is in an acid range. This helps further improve the dispersion stability of the particles of the copper compound coated with the polycarboxylic acid.

As the high-molecular dispersing agent, there can be used the one of the type that is constituted by the main chain only, the one of the comb-type structure having side chains, or the one of the type of star structure.

It is desired that the dispersing agent is contained in the dispersion solution in an amount of 0.01 to 2 wt % and, specifically, 0.1 to 1 wt %. When the amount of the dispersing agent is smaller than the above range, dispersion property of the fine particles of the copper compound cannot be improved more than that of when the amount thereof is in the above-mentioned range. Even when the amount of the dispersing agent is larger than the above range, on the other hand, no further improved effect can be expected but bringing about disadvantage in economy.

The dispersing solution of the present invention can be blended with known additives such as antioxidant, ultraviolet ray absorber, antistatic agent, dye and the like agent according to a recipe known per se.

[Solvents]

As the solvent to be used for the dispersion solution of the invention, there can be favorably used a non-aqueous solvent capable of forming two separate phases with the high-boiling solvent. Though not limited thereto only, there can be exemplified low-boiling solvents, i.e., esters such as methyl acetate, ethyl acetate and butyl acetate; hydrocarbons such as hexane, heptane, toluene, xylene and cyclohexane; and ketones such as methyl isobutyl ketone, methyl ethyl ketone and cyclohexanone. Among them, the ester-type solvent is preferred and butyl acetate is specifically preferred.

The non-aqueous solvent which is the above-mentioned low-boiling solvent enables the dispersion solution of the present invention to be effectively used as a diluent for the hydrophobic coating compositions and resin compositions.

As will be described later, further, when it is attempted to disperse the particles of the copper compound that are in a paste-like form as a result of removing the low-boiling solvent after having been separated into two phases, it is allowable to use, as the solvent, water or a lower alcohol for the dispersion solution of the present invention.

As will be described later, further, when the high-boiling solvent containing the fine copper particles is to be used by itself, the solvent to be used will be a high-boiling solvent such as glycols.

[Method of Preparing the Dispersion Solution]

The dispersion solution of the present invention can be prepared by a method described below.

(1) First Step

A fatty acid copper, a stabilizing agent and a polycarboxylic acid are added to a high-boiling solvent followed by heating. There is thus prepared a dispersion solution of the high-boiling solvent containing the stabilizing agent and, dispersed therein, the fine particles of the copper oxide covered on the surfaces thereof with both the fatty acid and an ester compound of the fatty acid, and with the polycarboxylic acid.

Here, by adding the water together with the high-boiling solvent, it is allowed to render the fine particles of the copper oxide to be the fine particles of the monovalent copper oxide.

The heating temperature is, desirably, lower than a decomposition start temperature of the fatty acid copper that is used and, concretely, is in a range of 180 to 230° C. The time for heating and mixing is, desirably, 30 to 360 minutes.

As the high-boiling solvent, there can be exemplified glycols such as ethylene glycol, diethylene glycol, triethylene glycol and polyethylene glycol. The high-boiling solvent is suitably selected in combination with a low-boiling solvent that will be described later.

The amount of the fatty acid copper that is added is, desirably, in a range of 0.1 to 5 parts by weight per 100 parts by weight of the high-boiling solvent. When the amount of the fatty acid copper is smaller than the above range, antiviral property may not be imparted to the dispersion solution as sufficiently as when the amount thereof is within the above range. On the other hand, when the amount of the fatty acid copper is larger than the above range, it would become disadvantageous in economy while impairing applicability and formability as compared to when the amount thereof is within the above range.

The amount of the water that is added is, desirably, in a range of 0.1 to 5 parts by weight per 100 parts by weight of the high-boiling solvent. When the amount of the water is smaller than the above range, the cuprous oxide would form in a decreased amount. When the amount thereof is larger than the above range, on the other hand, the rate of reduction into the cuprous oxide becomes so large that the particle size increases.

The amount of the polycarboxylic acid that is added is, desirably, in a range of 0.01 to 5 parts by weight per 100 parts by weight of the high-boiling solvent. When the amount of the polycarboxylic acid is smaller than the above range, the copper oxide may not be maintained stable for extended periods of time as compared to when the amount thereof is within the above range. On the other hand, when the amount of the polycarboxylic acid is larger than the above range, it would become disadvantageous in economy and besides the remaining polycarboxylic acid would impair the texture.

Further, it is desired that the stabilizing agent is contained in an amount in a range of 0.01 to 0.1 parts by weight per 100 parts by weight of the high-boiling solvent. When the amount of the stabilizing agent is smaller than the above range, the copper oxide may not be maintained stable for extended periods of time as compared to when the amount thereof is within the above range. On the other hand, when the amount of the stabilizing agent is larger than the above range, stability of the copper oxide cannot be improved any more as compared to when the amount thereof is within the above range bringing about disadvantage in economy.

(2) Second Step

Next, a mixed solution is prepared by mixing together:

the dispersion solution of the high-boiling solvent containing the stabilizing agent and, dispersed therein, the fine particles of the copper oxide coated with the fatty acid, ester compound of the fatty acid and polycarboxylic acid; and a low-boiling solvent that has been blended with the above-mentioned dispersing agent in advance.

It is desired that the low-boiling solvent is added to the dispersion solution of the high-boiling solvent in an amount of 10 to 200 parts by weight per 100 parts by weight of the high-boiling solvent. It is desired that the dispersing agent is added to the low-boiling solvent in amount of 0.01 to 2 parts by weight per 100 parts by weight of the low-boiling solvent through it may vary depending on the amount of the fine particles of the copper oxide coated with the fatty acid, ester compound of the fatty acid and polycarboxylic acid in the dispersion solution of the high-boiling solvent.

As the low-boiling solvent, there can be used the above-mentioned non-aqueous solvent used for the dispersion solution. It is important that the low-boiling solvent is not compatible with the high-boiling solvent. These solvents should be used in such a combination that a difference in the solubility parameter (Sp-value) is not less than 3 between the high-boiling solvent and the low-boiling solvent.

When a diethylene glycol (Sp-value: 12.6) is used as the high-boiling solvent, it is desired to use a butyl acetate (Sp-value: 8.4) as the low-boiling solvent.

(3) Third Step

The above mixed solution is left to stand still at a temperature of 0 to 40° C. for 30 to 120 minutes so that the high-boiling solvent and the low-boiling solvent are separated into different phases. After the mixed solution is separated into different phases, the fine particles of the copper oxide coated with the fatty acid, ester compound of the fatty acid and polycarboxylic acid in the mixed solution are extracted by the low-boiling solvent. Here, since the low-boiling solvent has been blended with the dispersing agent, the adsorption groups of the dispersing agent are coordinated on the fine particles of the copper oxide permitting, therefore, the fine particles of the copper oxide to be easily extracted by the low-boiling solvent.

Next, the high-boiling solvent is removed from the mixed solution that has been separated into phases, and there is thus obtained a dispersion solution containing the fine particles of the copper oxide coated with the fatty acid, ester compound of the fatty acid and polycarboxylic acid being dispersed in the low-boiling solvent.

The high-boiling solvent can be removed by a customary method such as simple distillation, reduced-pressure distillation, precision distillation, thin-membrane distillation, extraction or membrane separation.

Here, in the above-mentioned first step, it is also allowable to blend the high-boiling solvent with the fatty acid copper, polycarboxylic acid, stabilizing agent, as well as sodium chloride and sodium bromide to transform the fine particles of the copper compound dispersed in the dispersion solution into the fine particles of a halide of copper.

[Other Methods of Preparing the Dispersion Solution]

In addition to being produced by the above-mentioned method, the dispersion solution containing the fine particles of the copper oxide coated with the fatty acid being dispersed in the low-boiling solvent can also be produced by the methods described below.

That is, in the first step in the above-mentioned method, the fatty acid and a copper compound are added in combination instead of adding the fatty acid copper. In other respects, the procedure is carried out in the same manner as in the first production method.

Therefore, when, for example, a copper acetate is used as the copper compound, there can be prepared a dispersion solution in which are dispersed the fine particles of the copper acetate being coated with the fatty acid, ester compound of the fatty acid and polycarboxylic acid.

In this method, too, like in the above-mentioned method, the fine particles of the monovalent copper acetate coated with the fatty acid, ester compound of the fatty acid and polycarboxylic acid can be dispersed in the low-boiling solvent by adding the high-boiling solvent as well the water in the first step.

In the invention, further, it is also allowable to just use the dispersion solution obtained by dispersing the fine particles of the copper compound coated with the fatty acid, ester compound of the fatty acid and polycarboxylic acid in the high-boiling solvent obtained by the above-mentioned first step, i.e., in the glycols which are high-boiling solvents.

That is, there may be prepared a dispersion solution of glycols containing the stabilizing agent by adding the fatty acid copper, ester compound of the fatty acid copper, polycarboxylic acid and stabilizing agent to the glycols followed by heating and mixing to decompose the fatty acid copper so that the fine particles of the copper oxide are dispersed therein.

In this case, too, like in the case of the above-mentioned production method, glycols as well as water are made present so that the fine particles of the copper oxide are formed as the fine particles of the monovalent copper oxide to express excellent antiviral property.

In preparing the dispersion solution of the present invention, when a low-boiling solvent compatible with the glycols, such as ethanol or isopropanol is used as a dispersion medium, the low-boiling solvent can be removed by heating from the dispersion solution of the low-boiling solvent prepared by the above-mentioned preparation method to obtain a paste-like product thereof. The paste-like product is, thereafter, dispersed again in a solvent which is compatible with the glycols to thereby obtain a dispersion solution thereof.

That is, in the above-mentioned method of preparing the dispersion solution, the fine particles of the copper compound in the high-boiling solvent are extracted by the low-boiling solvent by separating the solvents into two phases. According to the method of separation into two phases, however, it is important to use the low-boiling solvent and the high-boiling solvent in combination, and it is difficult to disperse the fine particles of the copper compound in a desired low-boiling solvent that is compatible with the high-boiling solvent. By removing the low-boiling solvent from the dispersion solution to obtain a paste-like product thereof as described above, however, it becomes possible to provide the dispersion solutions in which the fine particles of the copper oxide coated with the fatty acid are dispersed in various kinds of solvents.

The conditions for heating, mixing and contraction may comply with the conditions of the first to third steps in the above-mentioned method of producing the dispersion solutions.

EXAMPLES

Example 1

To a diethylene glycol, there were added 2.5 wt % of a copper stearate and 0.05 wt % of a saccharin, and the mixture thereof was heated with stirring. At a moment when the temperature has reached 140° C., 1.0 wt % of distilled water was added thereto. The mixture thereof was, further, heated and after the temperature thereof has reached 190° C., heating was continued for another 2 hours. Thereafter, the diethylene glycol dispersion solution was cooled down to 60° C.

Next, there were, further, added thereto with stirring a butyl acetate in which have been dissolved 1.0 wt % of DISPERBYK-2090 (produced by BYK Chemie Japan Co.) that was a dispersing agent and 2.0 wt % of AKN-0.531 (produced by Nichiyu Co.) that was a polycarboxylic acid dispersing agent having a molecular weight of about 4,000. After left to stand still for about one hour, the butyl acetate layer was picked up to obtain a dispersion solution of fine particles of a cuprous oxide.

Example 2

There was added with stirring the butyl acetate in which has been dissolved 2.0 wt % of SC-0505K (produced by Nichiyu Co.) that was a polycarboxylic acid dispersing agent of a molecular weight of about 2,000 instead of dissolving the polycarboxylic acid dispersing agent used in Example 1.

Example 3

There was added with stirring the butyl acetate in which has been dissolved 2.0 wt % of AFB-1521 (produced by Nichiyu Co.) that was a polycarboxylic acid dispersing agent of a molecular weight of about 10,000 instead of dissolving the polycarboxylic acid dispersing agent used in Example 1.

Example 4

A dispersion solution of fine particles of a cuprous oxide was obtained in the same manner as in Example 1 but adding a salicylic acid instead of the saccharin.

Comparative Example 1

There was added with stirring the butyl acetate in which has been dissolved the DISPERBYK-2090 only without, however, adding the polycarboxylic acid dispersing agent used in Example 1.

Comparative Example 2

There was added with stirring the butyl acetate in which has been dissolved 2.0 wt % of AD-374M (produced by Nichiyu Co.) that was an amine compound dispersing agent of a molecular weight of about 3,000 instead of dissolving the polycarboxylic acid dispersing agent used in Example 1.

Comparative Example 3

There was added with stirring the butyl acetate in which has been dissolved 2.0 wt % of AD-3172M (produced by Nichiyu Co.) that was an amine compound dispersing agent of a molecular weight of about 2,000 instead of dissolving the polycarboxylic acid dispersing agent used in Example 1.

Comparative Example 4

There was added with stirring the butyl acetate in which has been dissolved 2.0 wt % of L-201 (produced by Nichiyu Co.) that was an amine compound dispersing agent of a molecular weight of about 1,000 instead of dissolving the polycarboxylic acid dispersing agent used in Example 1.

(Evaluating the Zeta Potential)

Zeta potentials were measured by using the zeta potential particle size molecular weight measuring system (ELSZ-2000ZS manufactured by Ohtsuka Denshi Co.) at a measuring voltage of 300 V. The larger the absolute values of the zeta potential, the higher the dispersion stability.

(Evaluating the Stability Over Time)

The dispersion solutions were checked for their states with the eye one week after they were prepared. Regarded to be ○ (highly stable over time) when there was no precipitation of particles and × (lowly stable over time) when there was precipitation of particles.

(Confirming the Formation of Fatty Acid Ester Compound in the Solvent)

It was confirmed relying on the IR if an ester compound of the diethylene glycol solvent and a stearic acid dissociated from the copper stearate we formed in the dispersion solution of Example 1.

(Confirming the Composition of Particles)

The composition of the copper compound particles in the dispersion solution of Example 1 was confirmed relying on the X-ray analysis.

TABLE 1

|  | Molecular weight | Adsorbed part | Solubility | Zeta potential (mV) | Stability over time |
|---|---|---|---|---|---|
| Ex. 1 | high | acidic | water-soluble | 30.91 | ○ |
| Ex. 2 | intermediate | acidic | water-soluble | 25.73 | ○ |
| Ex. 3 | high | acidic | water-insoluble | 35.10 | ○ |
| Ex. 4 | high | acidic | water-soluble | 32.94 | ○ |
| Comp. Ex. 1 | — | — | — | 30.16 | X |
| Comp. Ex. 2 | intermediate | basic | water-insoluble | −7.07 | X |
| Comp. Ex. 3 | intermediate | basic | water-soluble | −19.37 | X |
| Comp. Ex. 4 | low | basic | water-insoluble | −17.77 | X |

INDUSTRIAL APPLICABILITY

The fine particles of the copper compound contained in the dispersion solutions of the present invention exhibit such properties as antiviral property, antibacterial property, electrically conducting property, ultraviolet ray-shielding property and anti-fouling property. Specifically, the fine particles of the monovalent copper compound express antiviral property even against the viruses without envelope structure, such as noroviruses. Therefore, the dispersion solution of the present invention can be contained as a diluent in the resin compositions that constitute fiber products, or can be directly applied onto, or can be rendered imbibed by, the fiber products in order to impart antiviral property to the fiber products.

In addition to the sanitary products, the dispersion solution of the invention can also be adapted to various kinds of uses, such as electrically conducting films, films, metal sheets, glass plates, coating materials for ships, etc.

Moreover, by using a low-boiling solvent as the dispersion medium, the dispersion solution of the invention can be used as a diluent for the coating compositions and the resin compositions to thereby impart antiviral property to the films and the resin formed articles.

The invention claimed is:

1. A dispersion solution comprising a non-aqueous solvent which contains fine particles of a monovalent copper compound, a stabilizer, a fatty acid, a fatty acid ester of the fatty acid, and a polycarboxylic acid, wherein said polycarboxylic acid is a polymer compound having a repeating unit composed of a segment represented by the following formula and a segment derived from styrene or a polymer compound having a repeating unit composed of a segment represented by the formula, has a number average molecular weight of 2,000 to 10,000, and is contained in the dispersion solution in an amount of 0.01 to 5 wt %:

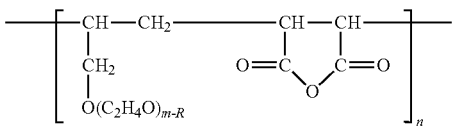

wherein R is a methyl group or an ethyl group, m is 11 when R is a methyl group, and m is 28 when R is an ethyl group, said stabilizer is a saccharin, and said non-aqueous solvent is an ester-type solvent or a ketone-type solvent.

2. The dispersion solution according to claim 1, wherein said monovalent copper compound is a cuprous oxide.

3. The dispersion solution according to claim 1, wherein said non-aqueous solvent is an ester-type solvent.

4. The dispersion solution according to claim 1, wherein a dispersing agent is, further, contained.

5. The dispersion solution according to claim 1, wherein said copper compound has antiviral property.

6. The dispersion solution according to claim 1, wherein said polycarboxylic acid is a polyfunctional comb polymer having an ionic group on a main chain and a polyoxyalkylene group on a side chain.

7. The dispersion solution according to claim 1, wherein said polycarboxylic acid has a pH of 2 to 4 and a kinetic viscosity at 25° C. of 2,000 to 10,000 mm²/s.

* * * * *